United States Patent
Lehmann et al.

(12) 
(10) Patent No.: US 6,495,790 B2
(45) Date of Patent: Dec. 17, 2002

(54) PLASMA ARC KEYHOLE WELDING STABILITY AND QUALITY THROUGH TITANIUM NITRIDE ADDITIONS

(75) Inventors: John M. Lehmann, Forest, VA (US); John M. Sanders, Canton, OH (US); William A. McInteer, Lynchburg, VA (US)

(73) Assignees: McDermott Technology, Inc., New Orleans, LA (US); BWX Technologies, Inc., Lynchburg, VA (US)

( * ) Notice: Subject to any disclaimer, the term of this patent is extended or adjusted under 35 U.S.C. 154(b) by 0 days.

(21) Appl. No.: 09/861,004

(22) Filed: May 18, 2001

(65) Prior Publication Data

US 2002/0170888 A1 Nov. 21, 2002

(51) Int. Cl.⁷ .............................................. B23K 10/00
(52) U.S. Cl. ............................ 219/121.46; 219/121.59; 219/137 WM

(58) Field of Search ....................... 219/121.46, 121.59, 219/137 WM, 137 R

(56) References Cited

U.S. PATENT DOCUMENTS 4,918,283 A * 4/1990 Yamade et al. ......... 219/121.46
5,225,654 A * 7/1993 Harwig et al. ......... 219/121.46
5,750,955 A * 5/1998 Yoshino ................. 219/121.46

FOREIGN PATENT DOCUMENTS

JP  358058991 A * 4/1983
JP  406315771 A * 11/1994

* cited by examiner

*Primary Examiner*—Mark Paschall
(74) *Attorney, Agent, or Firm*—R. C. Baraona

(57) ABSTRACT

A method for reducing or eliminating sagging in plasma arc keyhole welds adds a fluxing agent to the weld. The fluxing agent may be titanium nitride and/or titanium carbonitride. The fluxing agent is added using physical vapor deposition or by painting a slurry onto the weld surface.

8 Claims, No Drawings

PLASMA ARC KEYHOLE WELDING STABILITY AND QUALITY THROUGH TITANIUM NITRIDE ADDITIONS

FIELD AND BACKGROUND OF THE INVENTION

The present invention relates generally to the field of plasma arc keyhole welding and in particular to a new and useful process for using a flux during plasma arc keyhole welding to provide improved welds.

Fluxing agents are known for adding to molten weld puddles in welding processes for the purpose of protecting the molten metal from atmospheric contamination by oxygen, nitrogen or hydrogen, or removing contaminants such as sulfur and-oxygen from the molten weld puddle. Welding processes for which the use of fluxing agents are known are submerged arc welding, gas metal arc welding, shielded metal arc welding, electroslag welding, and to some degree, gas tungsten arc welding. However, the inventors are not aware of any prior use of fluxing agents with plasma arc welding processes. Further, there is no documented use of fluxing agents in plasma keyhole welding for the purpose of reduction of sagging tendencies where molten metal is pulled out of the joint by gravity.

Plasma arc keyhole welding produces a hole through a workpiece having molten metal sides. As the welding arc is moved along the joint, the molten metal-sided keyhole progresses along the weld seam. The solidifying metal at the trailing edge of the weld creates the final weld. Initiating a plasma arc keyhole can lead to instability of the molten weld metal as the flow of plasma gas bores into the workpiece and exits the root side of the weld. The amount of instability can be affected by a number of factors including material thickness, composition and joint design.

In particular, in the case of plasma arc welding, materials over 0.250 inches thick often experience significant instability problems.

Molten metal drop-through is a common problem experienced during plasma arc keyhole welding. Gravity causes the molten metal to sag through the joint, and in some cases, to fall out of the joint.

Production experience has shown that approximately 3% of start areas in welds on nickel-based materials exhibited sagging when the keyhole was initiated. Most applications of plasma arc keyhole welding recommend the use of a disposable weld tab for arc initiation due to the known instability problem. But weld tabs cannot be used in all applications.

SUMMARY OF THE INVENTION

It is an object of the present invention to reduce molten metal drop-through during plasma arc keyhole welding using a fluxing agent.

It is a further object of the invention to provide specific fluxing agents for use during plasma arc keyhole welding to provide improved weld stability and quality.

Accordingly, a fluxing agent is added to a plasma arc keyhole weld. In the case of nickel-based alloys and stainless steels; the fluxing agent is preferably a titanium nitride-containing fluxing agent. The fluxing agent is added to the surface of the weld joint using physical vapor deposition or mechanically painting a flux slurry onto the weld material surface. Alternatively, the flux may be added to the base weld metal during manufacture of the metal alloy or as a powder to the molten metal puddle at the start of the welding operation.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is illustrated.

DESCRIPTION OF THE PREFERRED EMBODIMENTS

It was unexpectedly found during destructive evaluation of plasma arc keyhole welds which did not have sagging that the surfaces of such non-sagging welds had a high density of titanium nitride and/or titanium carbonitride particles. In contrast, when sagged areas of plasma arc keyhole welds were destructively examined, none of those type particles were found to be present. Further experimentation yielded the conclusion that these materials provide increased surface tension to the molten metal around the keyhole resulting in increased resistance to sagging caused by gravity.

Test welds were performed in which titanium nitride was applied as a fluxing agent to sample surfaces prior to welding with plasma arc keyhole welds. The fluxing agent was applied using two methods. The first method was to prepare a fluxing agent slurry of titanium nitride powder with an acetone carrier, and then paint the slurry onto the weld surface in a thin film. The sample was then welded using plasma arc keyhole welding.

The second method utilized physical vapor deposition of a thin layer of titanium nitride particles onto the surface of a consumed spacer. The sample was then welded using a plasma arc keyhole weld.

In each case, the sample welds where the titanium nitride was added showed greater keyhole stability and reduced sagging during welding, as well as deeper fusion into the sidewalls of the weld. Metallographic examination of the welds-showed increased quantities of embedded titanium nitride (TiN) and/or titanium carbonitride (TiCN) particles in the root weld surface.

The presence of these particles combined with reduced weld thickness and increased fusion depth in the sidewalls supported the conclusion that the particles increase surface tension in the molten metal to produce improved welds. The overall effect of the use of the titanium nitride fluxing agents is that the welds formed using plasma arc welding have significantly reduced sagging and drop-through. The beneficial effects of the titanium nitride fluxing agents provide greater process margin against sag conditions.

The reduction or elimination of sagging in the welds formed by plasma arc keyhole welding significantly reduces the costs of this type of welding. Sags are expensive to repair, or in some cases, can result in expensive components being scrapped as unusable. Repeatable starts of the keyhole in thick materials when the fluxing agent is used allows plasma arc keyhole welding to be used across a wider range of welding applications at a significant cost savings.

It was found that both titanium nitride and titanium carbonitride improved or eliminated sagging in plasma arc keyhole welds and that either is useful as a fluxing agent, especially with nickel-based materials. It is envisioned that the, fluxing agent particles could also be added to metal alloys during their formation or applied directly to the molten weld puddle as a powder during welding, such as with overlay cladding operations with similar effects.

While a specific embodiment of the invention has been described in detail to illustrate the application of the principles of the invention, it will be understood that the invention may be embodied otherwise without departing from such-principles.

We claim:

1. A method for making a plasma arc keyhole weld without sagging, the method comprising:

providing a workpiece;

applying at least one of a titanium nitride fluxing agent and a titanium carbonitride fluxing agent to the weld workpiece; and welding the workpiece using a plasma arc keyhole welding process.

2. A method according to claim 1, wherein the step of applying the fluxing agent comprises painting a slurry of fluxing agent on the workpiece.

3. A method according to claim 1, wherein the step of applying the fluxing agent comprises using physical vapor deposition to form a coating of fluxing agent on the workpiece.

4. A method of forming a plasma arc keyhole weld without sagging, the method comprising:

providing a workpiece having a fluxing agent associated therewith; and welding the workpiece using a plasma arc keyhole welding process;

wherein the welding process creates a molten metal puddle having a defined surface tension;

wherein the surface tension of the molten metal puddle is increased by the fluxing agent; and wherein the fluxing agent is at least one of: titanium nitride and titanium carbonitride.

5. A method according to claim 4, further comprising coating the workpiece with a slurry of the fluxing agent.

6. A method according to claim 4, further comprising applying the fluxing agent to the workpiece by physical vapor deposition.

7. A method according to claim 4, further comprising forming the workpiece by mixing the fluxing agent into a metal alloy.

8. A method according to claim 4, further comprising adding the fluxing agent directly to the molten metal puddle during the welding.

* * * * *